Patented Apr. 30, 1935

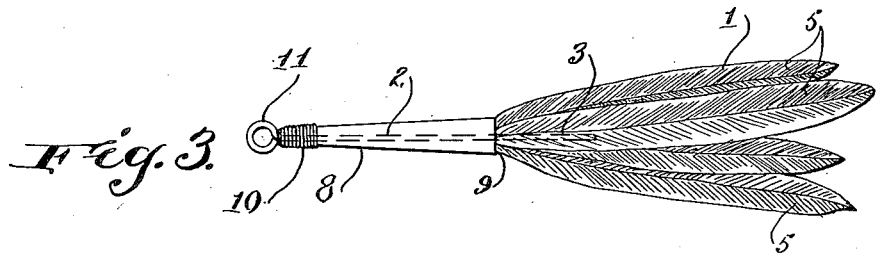
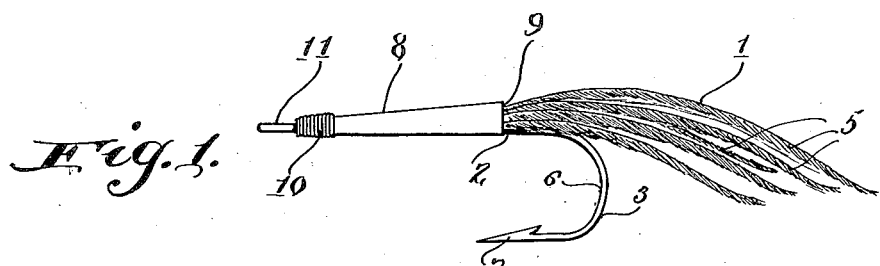
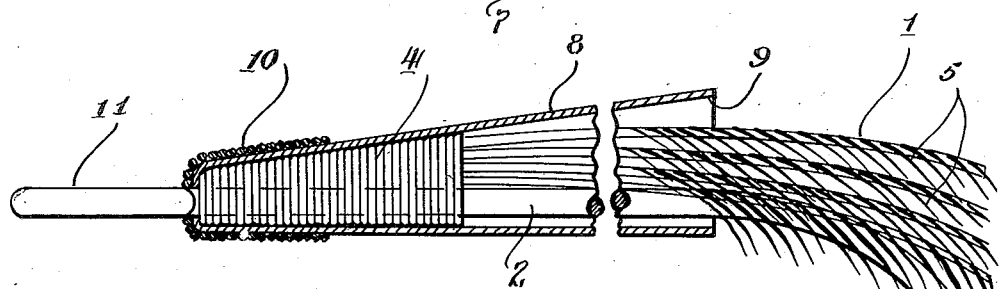
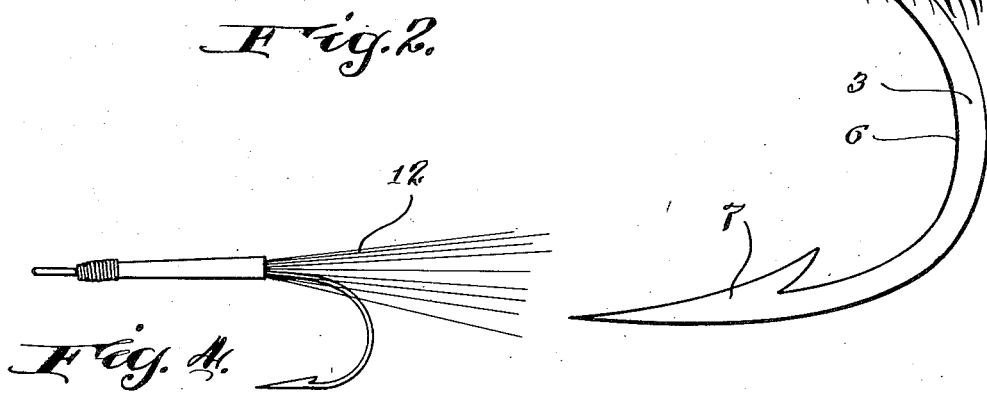

1,999,416

UNITED STATES PATENT OFFICE 1,999,416

ARTIFICIAL FISH BAIT

Thomas E. Loving, Baltimore, Md.

Application April 6, 1932, Serial No. 603,465

3 Claims. (Cl. 43—42)

The invention relates to a bait in the form of an artificial minnow which combines the solid body feature of the wooden plug and the wiggling feature of the heavy combination metal and bucktail baits. This bait is so light that it can be handled with ease on a fly rod and used after the manner of an artificial fly, or it can be used in trolling on the surface of the water or for deep trolling or casting. The bait is also preferably so constructed that a gut or wire leader can be attached direct to the hook. The bait of the invention is further so devised that any fisherman can operate it in a manner that will present the appearance and action of a living minnow.

The construction by which this result is obtained comprises a layer of feathers secured to the shank of a hook, the feathers being substantially in or parallel to a single plane at right angles to the plane of the bend of the hook. By so laying the feathers, the hackle, the term being used herein as applying to the hairs or barbs which extend laterally from the quill, is caused to maintain its normal relation to the quill, the action of the water tending to pull the hackle of the feather together so that it becomes stringy when wet, being overcome. In the construction of the bait, according to the invention, the quills or spines of the feathers are bound to the shank of the hook and covered by a hollow body of larger diameter than the bound portion of the combined quills and the body, which preferably extends beyond the binding. This hollow body allows the feathers to move freely with the action of the water but prevents too great lateral deflection, and keeps them in alignment and conformance with the body.

The arrangement described causes the bait and bend of the hook to act as a keel, keeping a constant pressure on the feathers and opening the hackle which moves and wiggles in contact with the water as it is drawn along. In connection with these feathers, the body presents a solid appearance and can be made in varied shades or color, the tip end being separately colored or emphasized to represent the head and/or eyes of the fish. While the bait in the preferred form is light, any desired amount of weight can be added within the body to adapt it to different forms of fishing including a manipulation similar to that used in bait casting. The body may be made of metal, a cellulose material or quill or any tubular construction, and the tail may be of feathers or hair, as bucktail.

The bait in the form in which it is illustrated, and in which it has been thus far developed, when in the water resembles very closely the type of minnow generally known as a shiner and/or other species of small fish, which comprise the main source of food supply for fresh and salt water game fish.

In the accompanying drawing I have illustrated a bait embodying the features of my invention.

In the drawing:

Figure 1 is a side elevation of the bait in the preferred form, the tail portion being formed of feathers.

Figure 2 is a section in a plane parallel to Figure 1, showing the manner of binding and arranging the feathers.

Figure 3 is a plan view looking downwardly on the bait as shown in Figure 1.

Figure 4 is a view corresponding to Figure 1, showing the tail portion formed of bucktail hairs or buck hairs instead of feathers.

Referring to the drawing by numerals, the tail portion of the bait is first formed by securing a number of feathers, 1, to the shank 2 of a hook 3 of suitable size and construction. These feathers are secured by binding by means of the thread generally used for this purpose, the binding being indicated by reference character 4. The hackle of the feathers indicated by reference character 5 is preferably laid in a single plane at right angles to the plane of the curve or bend 6 of the hook so that the curve or bend terminating in the barbed point 7 extends downwardly and serves as a keel, guiding and balancing the bait in the water. The binding or winding 4 is covered by a tubular body 8 which may be of quill, a cellulose material or metal, preferably of a slightly conical tubular form. This body extends beyond the winding, the large open end of the cone at 9 serving to guide and support the feathers and to prevent too great lateral deflection which would tend to cause them to break, at the same time permitting them to move with a fair degree of freedom as the bait is drawn through the water, the tendency to excessive spreading being, however, overcome.

As shown, the forward end of the body, where it tapers to the eye of the hook, may be colored or otherwise distinguished and emphasized, as shown at 10, to illustrate the head of the fish. The eye 11 is left uncovered and is intended to be attached directly to a gut or wire leader.

In Figure 4 I have shown a similar bait in which the tail portion 5 in Figure 1 is formed of buck hairs or bucktail, indicated by reference character 12.

The fish bait of the invention is so constructed that while it includes a solid body feature sufficiently large to serve the purposes of a wooden plug, it has the wiggling action when drawn through the water which is peculiar to the combination metal and bucktail baits. This body is at the same time light enough to be operated by means of a fly rod after the manner of an artificial fly. It can also be trolled on the surface of the water or used for deep trolling, or it may be weighted and used in casting after the manner of bait casting. Its construction and operation are such that any fisherman, whether or not he be experienced, can by its use, represent the appearance and action of a living minnow or other small fish comprising the main source of food of the majority of fresh and salt water game fish.

I have thus described an artificial bait embodying the features of my invention in the preferred form, the description being specific and in detail in order that the manner of using and applying the same may be fully understood, however, the specific terms herein are used descriptively rather than in a limiting sense, the scope of the invention being defined in the claims.

What I claim as new and desire to secure by Letters Patent is:

1. An artificial bait having the semblance of a minnow, while said bait is in action, for use in fly casting, the same consisting of a hook having a shank, a tail composed of flexible material, binding means attaching the flexible material to the shank with the flexible material extending backwardly well beyond the hook, the said flexible material to the rear of the binding extending laterally in planes substantially parallel to a plane at right angles to the plane of the curvature of the hook and a hollow body enclosing the flexible material and the binding thereon and extending along the shank beyond the binding, the inside of the body being slightly larger than the cross section of the flexible material therein and the shank and serving as a guide for the said material permitting the flexible material to have a limited movement therein, the forward end of the body being adapted to define the head of a minnow represented by the body and tail portion, the hook serving to balance the bait, the point and curved portion extending downwardly from the plane of the flexible material to the rear of the body, which in the use of the bait is normally substantially horizontal extending well to the rear of the body and hook.

2. An artificial bait having the semblance of a minnow, while said bait is in action, for use in fly casting, the same comprising a hook, feathers having quills, said quills being secured to the top and side portions of the shank of the hook, the feathers having lateral barbs located and distributed rearwardly beyond the bend of the hook for a distance substantially equal to the length of the hook, and a hollow body enclosing the shank and quills extending rearwardly toward the bend, the rear end of the body serving as a guide for the feathers and being of sufficient dimension to permit weaving of the feathers and at the same time limiting the lateral play of the same, the lateral barbs of the feathers being substantially parallel to a plane at right angles to the plane of the curve of the hook, said curve of the hook serving to balance the bait when in operation.

3. An artificial bait having the semblance of a minnow, while said bait is in action, for use in fly casting, the same comprising a hook having an eye, feathers having quills, said quills being secured to the upper portion of the shank of the hook by a wrapping cord, the feathers extending rearwardly and outwardly beyond the bend of the hook by a distance substantially equal to the length of the hook and a hollow tapered body member snugly enclosing the said wrapped portion and extending rearwardly beyond the said wrapped portion at a distance substantially equal to the length thereof, the feathers having a space within the rear portion of the hollow body member, to permit free movement of the feathers, the lateral barbs of the feathers being substantially parallel to a plane at right angles to the plane of the curvature of the hook, the hollow body being secured to the shank of the hook adjacent the eye, the hook shank extending along one side of the body member below the quills, the hook being positioned substantially in a vertical plane with the rear extremity of the body member whereby the hook causes the bait to remain in a balanced and upright position when in the water.

THOMAS E. LOVING.